(12) United States Patent
Gessner et al.

(10) Patent No.: US 7,305,289 B2
(45) Date of Patent: Dec. 4, 2007

(54) UNIVERSAL TRANSLATOR FOR VEHICLE INFORMATION

(75) Inventors: Michael F. Gessner, Akron, OH (US); Thomas Bertosa, Chardon, OH (US); Robert Sheppard, Westlake, OH (US)

(73) Assignee: SPX Corporation, Charlotte, NC (US)

( * ) Notice: Subject to any disclaimer, the term of this patent is extended or adjusted under 35 U.S.C. 154(b) by 463 days.

(21) Appl. No.: 10/960,261

(22) Filed: Oct. 7, 2004

(65) Prior Publication Data

US 2005/0267655 A1 Dec. 1, 2005

Related U.S. Application Data

(60) Provisional application No. 60/575,472, filed on May 28, 2004.

(51) Int. Cl.
*G06F 17/00* (2006.01)
(52) U.S. Cl. .......................................... 701/33; 701/29
(58) Field of Classification Search ..................... None
See application file for complete search history.

(56) References Cited

U.S. PATENT DOCUMENTS

| | | | |
|---|---|---|---|
| 5,555,498 A | | 9/1996 | Berra et al. |
| 5,646,865 A * | | 7/1997 | Alfaro et al. .................. 701/29 |
| 6,263,268 B1 * | | 7/2001 | Nathanson ..................... 701/29 |
| 6,526,340 B1 | | 2/2003 | Reul et al. |
| 6,636,790 B1 | | 10/2003 | Lightner et al. |
| 6,696,927 B2 | | 2/2004 | Flick |
| 6,701,233 B2 | | 3/2004 | Namaky et al. |
| 6,732,031 B1 | | 5/2004 | Lightner et al. |
| 6,732,032 B1 | | 5/2004 | Banet et al. |
| 6,816,760 B1 * | | 11/2004 | Namaky ....................... 701/29 |
| 7,209,813 B2 * | | 4/2007 | Namaky ....................... 701/29 |
| 2002/0070851 A1 * | | 6/2002 | Raichle et al. .............. 340/438 |
| 2003/0052801 A1 * | | 3/2003 | McClure et al. ............... 341/50 |
| 2004/0249526 A1 * | | 12/2004 | Hauer et al. .................. 701/29 |
| 2005/0038921 A1 * | | 2/2005 | McClure et al. ................ 710/1 |
| 2005/0089055 A1 * | | 4/2005 | Klose et al. ................ 370/419 |

* cited by examiner

*Primary Examiner*—Michael J. Zanelli
(74) *Attorney, Agent, or Firm*—Baker & Hostetler LLP

(57) ABSTRACT

The present invention allows vehicle information tools to be used with vehicle information systems even if lacking a common protocol for communication. The present invention operates by intercepting requests from vehicle information tools, translating the communications into a protocol understood by a vehicle information system and providing the translated communications to the vehicle information system. In response to the request, the vehicle information system generates responses, which are translated into a protocol understood by the vehicle information tool, and then provided to the vehicle information tool.

13 Claims, 9 Drawing Sheets

UNIVERSAL TRANSLATOR FOR VEHICLE INFORMATION

RELATED APPLICATIONS

This application claims the priority of U.S. Provisional Application Ser. No. 60/575,472, filed May 28, 2004, entitled UNIVERSAL TRANSLATOR FOR VEHICLE DIAGNOSTIC INFORMATION.

FIELD OF INVENTION

The present invention relates generally vehicle testing devices and, more particularly, to communication between testing devices and vehicle information systems.

BACKGROUND OF THE INVENTION

The Environmental Protection Agency (EPA) requires vehicle manufacturers to install on-board diagnostics (OBD) for emission control on their light-duty automobiles and trucks beginning with model year 1996. OBD systems (e.g., computer, microcontrollers, and sensors) monitor the vehicle's emission control systems to detect any malfunction or deterioration that causes emissions to exceed EPA-mandated thresholds. Such a system, for example, includes an oxygen sensor located in the vehicle's exhaust manifold and tailpipe.

The EPA requires that information monitored or calculated by OBD systems is made available through a standardized, serial 16-pin connector referred to as the DLC (Diagnostic Link Connector) or OBD connector. All physical and electrical characteristics of this connector are standard for all compliant vehicles sold in the United States after 1996. The EPA also mandates that, when emission thresholds are exceeded, diagnostic information characterized by OBD systems must be stored in the vehicle's computers so that it can be used during diagnosis and repair.

A second generation of OBD systems ("OBD-II" systems) monitors a wider range of data than the original OBD systems. The data monitored includes emission information, performance data, faults, and the like. The data can then be analyzed and/or employed to diagnose operation of a host vehicle. As an example, the monitored data can be analyzed to infer the vehicle's emission performance. In addition to emissions, OBD-II systems monitor vehicle speed, engine temperature, and intake manifold pressure. OBD-II systems also query and set manufacturer-specific data, such as data relating to the vehicle's engine, transmission, brakes, alarm, entertainment systems. OBD-II systems also monitor emission performance setting diagnostic trouble codes (DTCs), which indicate a mechanical or electrical problem with the vehicle. DTCs typically result in lighting a vehicle's MIL (Malfunction Indicator Lamp), which provides a visual notice to an operator and/or service technician.

In addition to the OBD-II systems, most vehicles manufactured after 1996 have electronic control units (ECUs) that control internal electromechanical actuators. Examples include ECUs that control fuel-injector pulses, spark-plug timing, and anti-lock braking systems. Generally, ECUs transmit status and diagnostic information over a shared, standardized electronic bus in the vehicle. The bus effectively functions as an on-board computer network with many processors, each of which transmits and receives data. The primary computers in this network are the vehicle's engine control module (ECM) power train control module (PCM), and transmission control module (TCM). The PCM typically controls or monitors ECUs associated with the vehicle's power train (e.g., its engine, transmission, and transfer case).

When a vehicle is serviced, data from the standardized bus can be queried using external diagnostic equipment, for example scan tools, that connect to the above-described 16-pin electrical connector (called an OBD-II connector for vehicles made after 1996). The OBD-II connector is typically located under the vehicle's dashboard on the driver's side. Data transferred through the connector to the scan tool yields data that identify a status of the vehicle and whether or not a specific component of the vehicle has malfunctioned. This facilitates the service process.

On board vehicle diagnostic systems, such as the OBD and OBD-II systems, are able to communicate via one or more protocols. Typically, vehicle information tools are also able to communicate via one or more protocols. The vehicle information tools and the vehicle diagnostic systems can then communicate with each other so long as they share one or more common protocols. Unfortunately, protocols continue to be developed that are employable by vehicle diagnostic systems and/or vehicle information tools. As a result, it can occur that a common protocol between a given vehicle information system and a given scan tool does not exist. As one example, a vehicle diagnostic system communicates via a newer protocol that an older vehicle information tool does not employ. As a result, the vehicle information system and the older scan tool are unable to communicate. As another example, a vehicle information system may communicate via an older protocol that a more recent scan tool does not employ. Once again, as a result, the vehicle information system and the scan tool are unable to communicate.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates vehicle information systems, devices, methods, and operations translating communications between vehicle information tools and vehicle information systems present in motor vehicles.

The present invention operates by intercepting diagnostic requests from vehicle information tools (e.g., scan tools, code readers, and the like) translating the communications into a protocol understood by a vehicle information system and providing the translated communications to the vehicle information system. In response to the request, the vehicle information systems generate diagnostic responses, which are translated into a protocol understood by the vehicle information tool, and then provided to the vehicle information tool. As a result of the present invention, vehicle information tools can be used with vehicle information systems despite lacking a common protocol for communication. Other systems and methods are disclosed.

To the accomplishment of the foregoing and related ends, the invention comprises the features hereinafter fully described and particularly pointed out in the claims. The following description and the annexed drawings set forth detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
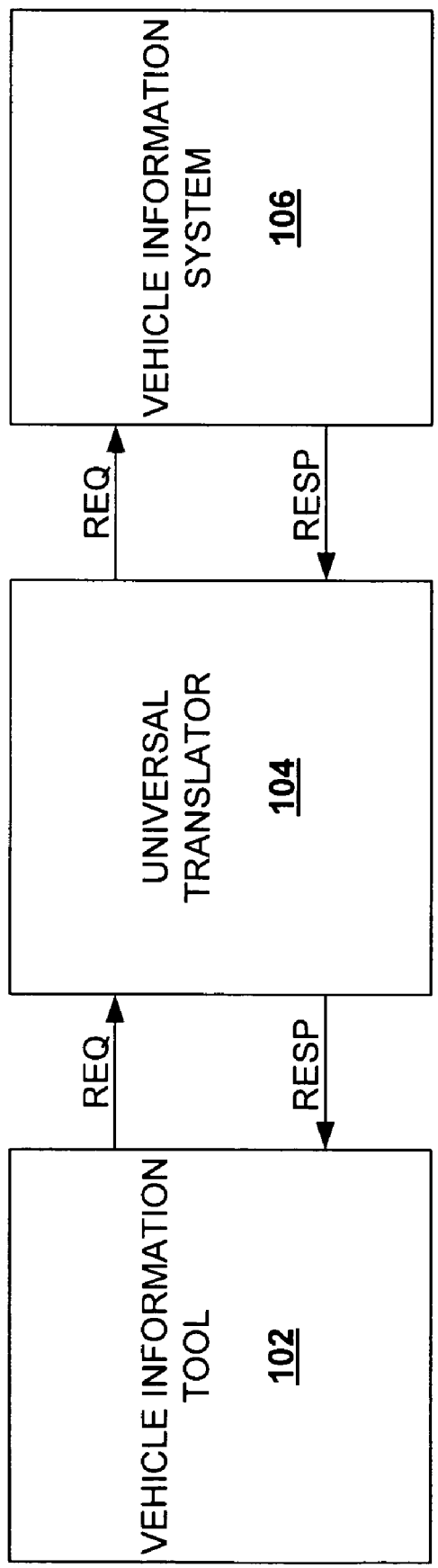
FIG. 1 is a block diagram illustrating a diagnostic system in accordance with an aspect of the present invention.

The present invention will now be described with reference to the attached drawings, wherein like reference numerals are used to refer to like elements throughout. It will be appreciated by those skilled in the art that the invention is not limited to the exemplary implementations and aspects illustrated and described hereinafter.

The present invention facilitates motor vehicle information systems and operations by providing systems and methods for translating/mapping communication protocols used by vehicle information tools and vehicle monitoring diagnostic systems. Vehicle information systems (e.g., on board diagnostic systems and the like) are systems associated with vehicles that perform vehicle related functions including control, monitoring, data collection, fault detection, and the like. Typically, vehicle information systems are physically located on vehicles. Vehicle information tools (e.g., scan tools, code readers, engine analyzers, hand held diagnostic testers, and the like) communicate and/or interact with vehicle information systems in order to obtain collected data, obtain identified faults, alter operating parameters of the vehicle, obtain data in real time, and the like.

Motor vehicle's diagnostic control systems include one or more electronic vehicle control units located within motor vehicles. The control units can include various systems and/or subsystems within the motor vehicle. For example, a control unit can control an engine, a transmission, a brake or a steering mechanism. These control units are generally connected to a number of sensors and/or actuators. The vehicle control units include an interface to permit external communication with other electronic devices via one or more communication protocols. Some examples of control units present in motor vehicle information systems include an engine control unit, a transmission control unit, a brake control unit, and a speed control unit.

A typical engine control unit can receive a number of signals from a number of sensors, including but not limited to, coolant temperature sensor, an oxygen sensor, an intake manifold pressure sensor, an air-conditioner switch, a vehicle speed sensor, an accelerator switch, a throttle position sensor, a neutral switch, and an engine speed sensor. The engine control unit receives the above signals and can generate a number of output control signals in response to control engine components. Some examples of components that can be controlled by the generated control signals include a canister purge solenoid, an exhaust gas recirculation (EGR) system actuator, an idling control actuator, an ignition coil, and/or a plurality of fuel injectors.

A typical transmission control unit also receives a plurality of input signals from various sensors. The transmission control unit outputs various control signals in response to these input signals. These control signals can control various automatic transmission actuators and thereby control an automatic transmission. A brake control unit receives a plurality of input signals from a brake switch and/or a plurality of wheel speed sensors. In response to these input signals, the brake control unit can produce various control signals that control brake actuators of an anti-lock braking system.

A typical speed control unit receives input signals from a speed set switch and a vehicle speed sensor. In response to these input signals, the speed control unit adjusts a throttle actuator to run the motor vehicle at an approximately constant speed. The speed control unit can also receive input signals from a brake switch, an accelerator switch, a neutral switch, a deceleration switch and/or a resume switch. In response, the speed control unit can discontinue constant speed control or reset a constant speed after changing the speed of the motor vehicle. Thus, as described supra, a typical motor vehicle utilizes multiple control units for controlling the operation of the motor vehicle.

One function performed by a motor vehicle control system involves the monitoring of motor vehicle emissions. The Federal Clean Air Act of 1990 required that all cars and light trucks sold in the United States after Jan. 1, 1996, adhere to the California Air Resources Board (CARB) requirements. A primary objective of the CARB requirements was the implementation of a system, within a motor vehicle, to monitor the electronic engine management and emission control systems of the motor vehicle. This system was to alert a driver, in the early stages, of an emission control component or system failure and provide vehicle information about the failure. In response to the CARB requirements, on-board diagnostics (OBD) II was implemented. The Society of Automotive Engineers (SAE) has set forth numerous standards that are applicable to OBD II equipped motor vehicles. For example, SAE J2012 sets forth the common diagnostic trouble codes (DTCs) and SAE J2190 defines the common diagnostic test modes (DTMs).

Currently, an OBD II compliant vehicle can include one or more of five communication protocols; SAE J1850 variable pulse width modulation (VPWM), SAE J1850 pulse width modulation (PWM), ISO 9141-2 (ISO), ISO 14230-4 (K2K), and ISO 15765-4 (CAN). Many General Motors (GM) cars and light trucks implement the J1850 VPWM communication protocol. A large number of current Chrysler, European and Asian Import vehicles implement the ISO 9141-2 communication protocol. A number of current Ford vehicles implement the J1850 PWM communication protocol.

Control units within Motor vehicle's diagnostic control systems monitor sensors for faults and/or fault conditions and log faults that occur to a system memory. Typically, a malfunction indicator lamp (MIL) is also lit to inform a driver of the motor vehicle that a problem exists. Subsequently, a service technician can attempt to trouble-shoot an indicated fault by connecting a vehicle information tool, such as a scan tool, a code reader, an engine analyzer, a hand held diagnostic tester, and the like to a diagnostic link connector of the motor vehicle information system.

A typical vehicle information tool includes a microcontroller and interface circuitry to convert the electronic signals supplied by a control unit in the motor vehicle to a signal/protocol that is readily useable by the microcontroller of the vehicle information tool. The vehicle information tool can also include other features including, but not limited to, adjusting module configuration settings, flash reprogramming, data access, and the like. Generally, vehicle information tools initiate requests that are sent to motor vehicle information systems, which then generate responses that are provided back to the vehicle information tools.

As an example, some vehicle information tools do not employ or properly employ all of the protocols included in the OBD II standard. Some vehicle diagnostic control systems employ protocols not included by these vehicle information tools. As a result, some vehicle information tools are unable to properly communicate with some vehicle diagnostic control systems.

FIG. 1 is a block diagram illustrating a diagnostic system 100 in accordance with an aspect of the present invention. The view presented in FIG. 1 is described at a high level to facilitate understanding of the present invention. The system 100 facilitates obtaining and utilizing vehicle information by permitting vehicle information tools to be used with motor vehicle information systems despite not having a common or compatible communication protocol. The system 100 can operate in accordance with a number of vehicle diagnostic standards including, but not limited to, on board diagnostics (OBD), on board diagnostics II (OBD II) and enhanced on board diagnostics II (enhanced OBD II), and manufacturer specific on board diagnostics. The manufacturer specific on board diagnostics standard is intended to include OBD, and enhanced OBD standards. The diagnostic system 100 includes a vehicle information tool 102, a universal translator 104, and a vehicle information system 106.

The system 100 is operable to obtain vehicle information and perform functions including, but not limited to, updating calibration settings, altering drive axle ratio, viewing diagnostic data, viewing DTCs, re-flashing modules and/or control units of the vehicle diagnostic system, define location of tire pressure monitor sensors, and the like.

Figure 2:
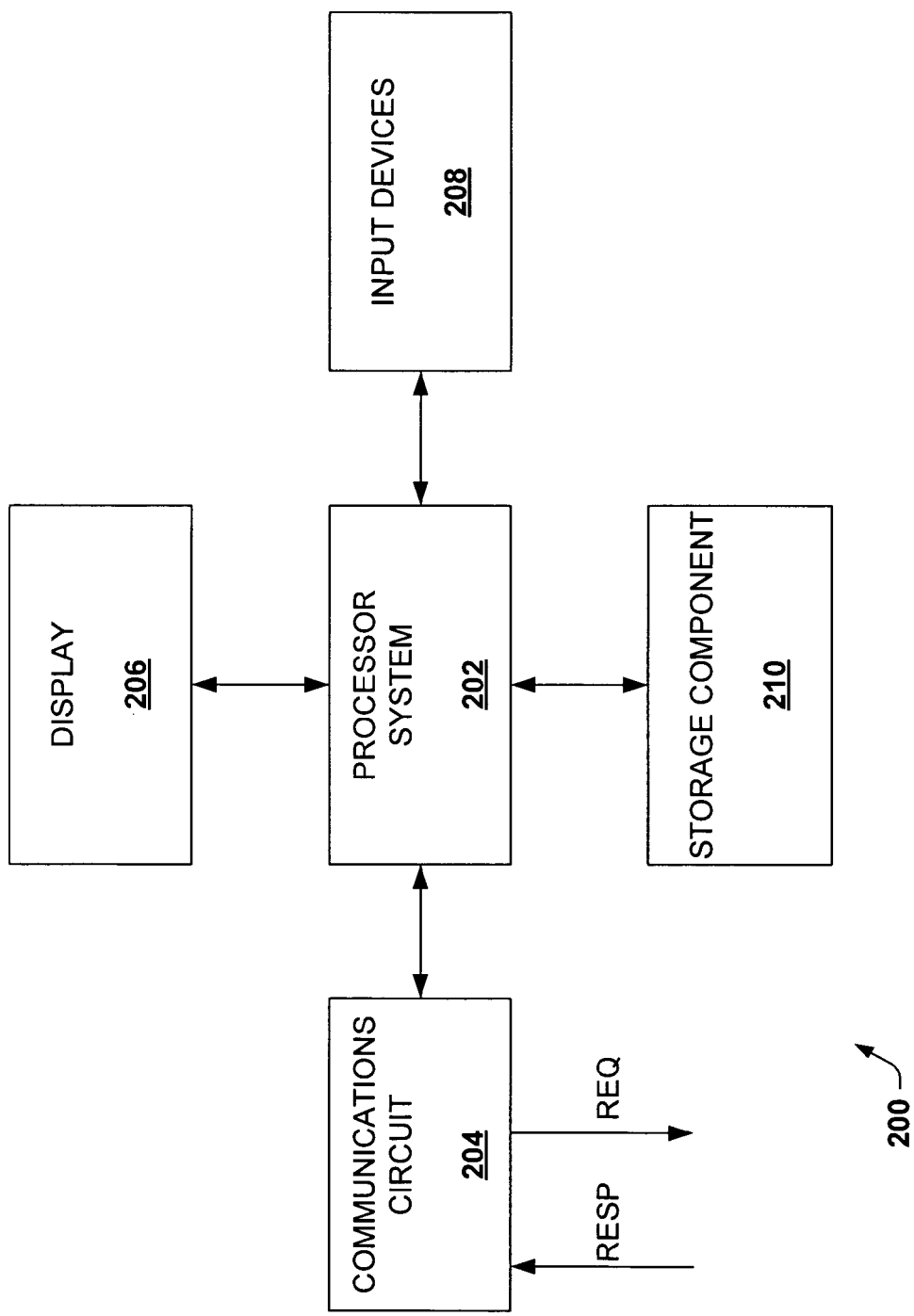
FIG. 2 is a block diagram illustrating a vehicle information tool in accordance with an aspect of the present invention.

The vehicle information tool 102, such as a scan tool, a code reader, an engine analyzer, a hand held diagnostic tester, and the like, includes a controller, circuitry, and an interface that allow transmission of and reception of diagnostic requests and information. However, it is appreciated that the vehicle information tool can be comprised of other components instead of or in addition to the above mentioned components. The vehicle information tool 102 is operable to communicate via one or more diagnostic protocols (e.g., VPWM, PWM, ISO, K2K, and CAN). The set of protocols known to the vehicle information tool 102 is referred to as the tool protocol(s). Additionally, the vehicle information tool 102 typically, but not necessarily, includes a display and an input device (e.g., keypad), and can also include other components such as an audio output device (e.g., speaker), a printing device, and the like. FIG. 2, described below, provides an example of a suitable vehicle information tool that can be employed for the vehicle information tool 102.

The vehicle information system 106, in this aspect, includes a number of control units such as an engine control unit, a transmission control unit, a brake control unit, and a speed control unit. The vehicle information system 106 is also operable to communicate via one or more diagnostic protocols. Typically, an OBD and/or OBD-II connector is present to facilitate communication with the vehicle information system 106. However, it is appreciated that other types of connections and/or connectors including wired and wireless are contemplated and within the scope of the present invention. The set of protocols known to or usable by the vehicle information system 106 is referred to as the vehicle protocol(s). However, the diagnostic protocol(s) employed by the vehicle information system 106 can be unknown or unused by the vehicle information tool 102. As a result, direct communication between the vehicle information system 106 and the vehicle information tool 102 via a common protocol may not be possible.

The number of control units present within the vehicle information system 106 can individually employ different protocols. As an example, an engine control unit could employ a first protocol (e.g., ISO) while a brake control unit employs a second protocol (e.g., CAN). As a result, communication with the vehicle information system 106 can employ and/or require different protocols depending upon the control unit being accessed. As an example, communication with the vehicle information system 106 related to the engine control unit is preferable in the first protocol whereas communication with the vehicle information system 106 related to the brake control unit in the second protocol, is preferable. Thus, the preferable protocol employed for a communication link with the vehicle information system can vary depending on the target control unit. The universal translator 104 is coupled to the vehicle information tool 102 and the vehicle information system 106. Communication mediums, including wired cables, wireless networks, cellular networks, Bluetooth, WiFi, and the like can be employed to communicate between the translator 104 and the vehicle information tool 102 and the vehicle information system 106. The universal translator 104 can communicate via both the tool protocol(s) and the vehicle protocol(s).

The universal translator 104 establishes a communication link with the vehicle information system 106 via one of the vehicle protocol(s). A suitable mechanism to establish the communication link can be employed. One such mechanism follows. Initially, a first protocol to test is selected and can be selected according to one or more factors including, but not limited to, instruction set, target control unit, and the like. An attempt is made to establish a link with the selected protocol between the universal translator 104 and the vehicle information system 106. If an answer is received, data is requested and responses are recorded. Remaining protocols are then selected and tested for responses to requested data. Then, a protocol that provides the most and/or desired data is selected as the protocol to employ by the universal translator 104. Other mechanisms to select the communication protocol can be employed in accordance with the present invention.

The vehicle information tool 102 also establishes a communication link with the universal translator 104 via one of the tool protocol(s). A suitable mechanism, such as described above, can be employed to establish the communication link. It is appreciated that the universal translator 104 can establish its link with the vehicle information system 106 on its own or in response to the communication link being established between the vehicle information tool 102 and the universal translator 104. For example, the universal translator 104 can attempt to establish a link with the vehicle information system 106 on powering up or initializing. Alternately, as another example, the universal translator 104 can attempt to establish a communication link with the vehicle information system 106 only after communication has been established with the vehicle information tool 102.

The universal translator 104 can include a tool protocol switch (not shown) and a vehicle protocol switch (not shown). The tool protocol switch allows for a user to manually switch from an automatic protocol selection to a manual mode wherein the universal translator 104 employs a selected protocol for the communication link with the vehicle information tool 102. Similarly, the vehicle protocol switch allows for a user to manually switch from an automatic protocol selection to a manual mode wherein the universal translator 104 employs a selected protocol for the communication link with the vehicle information system 106.

During operation, the vehicle information tool 102 issues commands and/or requests according to the established tool protocol. The requests can indicate a number of operational modes and one or more Parameter IDs (PIDs). Some examples of operational modes under OBD II include current powertrain diagnostic data, powertrain freeze frame data, emission related diagnostic trouble codes, oxygen sensor monitoring test results, emissions control, fault checking, current operation, and the like. Some examples of PIDs include coolant temperature, catalyst ratios, and the like. These requests in the tool protocol are then received by the universal translator 104. A suitable communication medium (not shown), including wired and wireless communication mediums, is employed to transfer the requests in the tool protocol to the universal translator. On the universal translator 104 receiving a request in the tool protocol from the vehicle information tool 102, the universal translator 104 can pass the requests without modification to the vehicle information system 106 if the established tool protocol is also the established vehicle protocol. To do so, the universal translator 104 can include switchable passthrough circuitry that creates a direct physical connection between the vehicle information tool 102 and the vehicle information system. Otherwise, the universal translator 104 converts or translates the requests in the established tool protocol to requests according to the established vehicle protocol and then sends the translated requests to the vehicle information system 106. The translation of requests from one protocol to another includes altering header information, packet size, splitting packets, combining packets, and configuring/modifying physical connections to the vehicle information tool 102 and the vehicle information system 106. Converting from one protocol to another typically involves converting a header format and passing mode operation. Encapsulation of data can also vary from one protocol to another. As a result, some conversions/translations involve combining packets of one protocol to a single packet of another protocol and separating or generating multiple packets of one protocol from a single packet of another protocol.

The vehicle information system 106 responds to requests in the established vehicle protocol by issuing diagnostic responses according to the established vehicle protocol. The responses are provided to and received by the universal translator 104. A suitable communication medium (not shown), including wired and wireless communication mediums, is employed to transfer the responses in the established vehicle protocol to the universal translator. If the established vehicle protocol is also the established tool protocol, the universal translator 104 can pass the responses without modification to the vehicle information tool 102. If not, the universal translator 104 converts or translates the responses in the established vehicle protocol from the vehicle information system 106 to responses according to the established tool protocol and then sends the translated responses to the vehicle information tool 102.

In addition to translating requests and responses, the universal translator 104 is also operable to cache responses and intercept subsequent requests. For example, if the vehicle information tool 102 generates a request for "Location of Oxygen Sensors", the universal translator can cache a response from the vehicle information system 106 so that subsequent requests for the information can be provided without passing the request to the vehicle information system 106 and waiting for a response from the vehicle information system 106.

Tables 1 and 2, shown below, illustrate exemplary diagnostic message formats for protocols that can be employed with the present invention. Table 1 depicts diagnostic message formats for ISO, K2K, and PWM-VPWM protocols. The table has columns for header bytes (hex), data bytes, in frame response (RESP), and error detection (ERR). The system 100 and other aspects of the present invention are operable to translate requests and responses from one protocol to another in the above protocols and other protocols. However, the present invention is not limited to only the protocols depicted in Tables 1 and 2. For the PWM and ISO protocols, the value of a first header byte is dependent on a bit rate of a data link and a type of message. A second header byte has a value that depends on a type of message, either a request or a response. For the K2K protocol, a value of a first header byte indicates an addressing mode (physical or functional) and a length of a data field. A second header byte is an address of a receiver of the message. A third header byte for the protocols of Table 1 is a physical address of a sender of a message. External test equipment is assigned the address F1. Other service tools shall use addresses in the range from F0 to FD. A response to all request messages is independent of the address of the external test equipment requesting the information.

Table 2 depicts a diagnostic message format for a CAN protocol. The size of a CAN identifier is either 11 bit or 29 bit. The CAN identifier is followed by an eight byte CAN frame data field. Up to three bytes can be employed for protocol control information prior to the service identifier.

TABLE 1

DIAGNOSTIC MESSAGE FORMAT FOR ISO 9141-2, ISO 14230-4, SAE J1850

| Header bytes (Hex) | | | | | |
|---|---|---|---|---|---|
| Priority/Type | Target address (Hex) | Source address (Hex) | Data bytes | ERR | RESP |
| Diagnostic request: SAE J1850 and ISO 9141-2 | | | | | |
| 68 | 6A | F1 | Maximum 7 data bytes | Yes | No |
| Diagnostic response: SAE J1850 and ISO 9141-2 | | | | | |
| 48 | 6B | ECU addr | Maximum 7 data bytes | Yes | No |

TABLE 1-continued

DIAGNOSTIC MESSAGE FORMAT FOR ISO
9141-2, ISO 14230-4, SAE J1850

Header bytes (Hex)

| Priority/Type | Target address (Hex) | Source address (Hex) | Data bytes | ERR | RESP |
|---|---|---|---|---|---|
| Diagnostic request: ISO 14230-4 | | | | | |
| 11LL LLLLb | 33 | F1 | Maximum 7 data bytes | Yes | No |
| Diagnostic response: ISO 14230-4 | | | | | |
| 10LL LLLLb | F1 | addr | Maximum 7 data bytes | Yes | No |
| Diagnostic request: SAE J1850 | | | | | |
| 61 | 6A | F1 | Maximum 7 data bytes | Yes | Yes |
| Diagnostic response: SAE J1850 | | | | | |
| 41 | 6B | addr | Maximum 7 data bytes | Yes | Yes |

TABLE 2

DIAGNOSTIC MESSAGE FORMAT FOR ISO 15765-4

| Header bytes | CAN frame data field | | | | | | | |
|---|---|---|---|---|---|---|---|---|
| CAN Identifier (11 or 29 bit) | #1 | #2 | #3 | #4 | #5 | #6 | #7 | #8 |

FIG. 2 is a block diagram illustrating a vehicle information tool 200 in accordance with an aspect of the present invention. The vehicle information tool 200, which includes tools such as a scan tool, a code reader, an engine analyzer, a hand held diagnostic tester, and the like, is exemplary in nature and is described at a high level to facilitate understanding of the present invention. The vehicle information tool 200 comprises a processor system 202, a communication circuit 204, a display 206, one or more input devices 208, and a storage component 210. The vehicle information tool 200 is operable to communicate with a vehicle information system in order to send requests for information and to receive responses in one or more protocols (e.g., VPWM, PWM, ISO, K2K, and CAN).

The processor circuit 202 can be comprised of one or more processors operating as a circuit to control operation of the vehicle information tool 200. The communication circuit 204 typically generates the one or more protocols with which the vehicle information tool 200 communicates. The one or more protocols can include present and future protocols, such as fiber optic and wireless communication protocols. However, it is appreciated that the one or more protocols may omit a common protocol required for direct communication with a target vehicle information system. The communication circuit 204 can be implemented in hardware, software, and/or a combination thereof.

The display 206 provides a graphical and/or textual output. The display 206 can be a textual display, liquid crystal display (LCD), plasma display, cathode ray tube (CRT) display, and the like. Additionally, the display 206 can be have a single screen and/or multiple screens. Furthermore, the display 206 can include other indicators such as light emitting diodes (LEDs), which also provide information output.

The input device 208 permits a user/operator to enter commands and requests and to provide other information. The input device 208 can include keyboards, keypads, touchpads, computer mouse, optical mouse, touch screens, and the like. The storage component 210 can store requests and responses and can be comprised of one or more types of memory data storage including, but not limited to, non-volatile memory, volatile memory, optical disks, hard drives, and the like.

It is appreciated that the vehicle information tool 200 is exemplary in nature and that variations of the vehicle information tool 200 as well as other vehicle information tools can be employed in accordance with the present invention. For example, the present invention can employ a vehicle information tool without a display and/or keypad.

Figure 3:
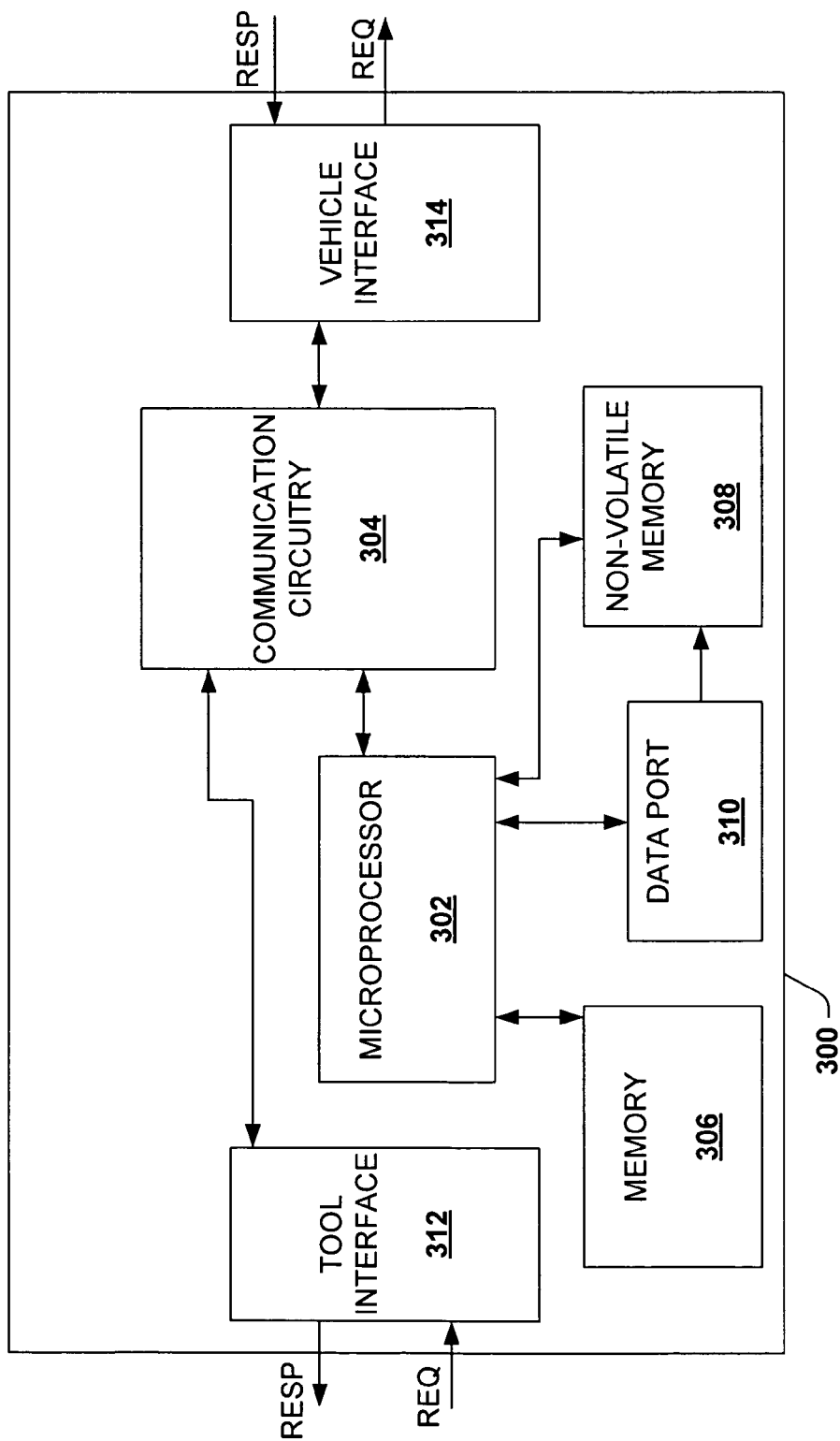
FIG. 3 is a block diagram illustrating a universal translator in accordance with an aspect of the present invention.

FIG. 3 is a block diagram illustrating a universal translator 300 in accordance with an aspect of the present invention. The translator 300 is operable to receive requests and responses in accordance with one or more protocols and to translate and provide requests and responses in accordance with one or more other protocols. The universal translator 300 includes a microprocessor 302, communication circuitry 304, a memory unit 306, a non-volatile memory unit 308, a data port 310, a tool interface 312, and a vehicle interface 314.

The tool interface 312 is operable to receive requests in a tool protocol and to provide responses in the tool protocol. The tool protocol can be one of a number of protocols usable by vehicle tools (e.g., OBD II compliant protocols). Similarly, the vehicle interface 314 is operable to receive responses in a vehicle protocol and to provide requests in the vehicle protocol. The vehicle protocol can also be one of a number of protocols usable by vehicle information systems (e.g., OBD II compliant protocols).

The communication circuitry 304 is operable to convert requests and responses from one or more translator protocols (e.g., OBD II compliant protocols, OBD compliant protocols, enhanced OBD II compliant protocols, and the like), which include the tool protocol and the vehicle protocol, into a microprocessor readable format and to selectively convert microprocessor format requests and responses into the one or more translator protocols.

The microprocessor 302 is coupled to the communication circuitry 304 and controls the communication circuitry 304 in order to translate received requests in the tool protocol to requests according to the vehicle protocol and then cause the requests in the vehicle protocol to be transferred to the vehicle interface 314. Additionally, the microprocessor 302 controls the communication circuitry 304 in order to translate received responses in the vehicle protocol from the vehicle interface 314 to responses in a tool protocol and then provide the responses in the tool protocol to the tool interface 312. The microprocessor 302 also controls the communication circuitry to establish communication links with vehicle information systems and vehicle information tools.

The memory unit 306 is coupled to the microprocessor and can include volatile and/or non-volatile memory. The memory unit 306 can be employed by the microprocessor 302 to cache received requests and received responses to provide faster responses to requests via the tool interface 312. Additionally, the memory unit 306 can be employed by the microprocessor 302 to store and/or log the received requests and responses, including data contained within the requests and/or responses, for later retrieval. A non-volatile memory unit 308 (e.g., flash memory) is also present and coupled to the microprocessor 302. The non-volatile memory unit 308 can also be employed by the microprocessor 302 to cache received requests and received responses. Additionally, the non-volatile memory unit 308 includes program code executable by the microprocessor 302 in order to perform the above described operations.

A data port 310 is also present and coupled to the non-volatile memory 308. The data port 310 can also be connected to the memory unit 306 and the microprocessor 302. The data port 310 is a suitable communication interface, such as universal serial bus 1.1 (USB 1.1), universal serial bus 2.0 (USB 2.0), serial, parallel, IEEE 1394 (Firewire), Ethernet networks adapters (e.g., 10 BaseT, Gigabit, 100 BaseT), wireless networks adapters (e.g., 802.11b (WiFi), 802.11g, 802.11a (WiFi), Bluetooth, Cellular and the like).

The data port 310 permits flashing of the non-volatile memory 308 by an external device. As a result, flashing can modify/update the program code present in the non-volatile memory 308 and thereby alter operation of the microprocessor 302. Such modifications include adding new protocols to the one or more translator protocols, correcting erroneous operation of the microprocessor 302, selecting or limiting protocols employed in the tool interface 312 and/or the vehicle interface 314, and adding additional functionality to the microprocessor 302 and, therefore, the universal translator 300. The data port 310 can also be employed to supply and extract data (cached responses and requests) from the memory unit 306 and/or the non-volatile memory 308 to an external device such as a personal computer (not shown). The extracted data can then be employed for record keeping, statistical analysis, and the like.

It is appreciated that alternate aspects of the invention can avoid including the data port and, instead, employ the tool interface 312 and/or the vehicle interface 314 in order to perform the operations described above in conjunction with the data port 310.

Although not shown, it is appreciated that a bus or system bus can be employed in the universal translator 300 in order to provide connections between the above components. It is also appreciated that additional components can be added to the translator 300 and still be in accordance with the present invention. Likewise, it is appreciated that variations of the translator 300, including variations without some of the above components, can also be employed in accordance with the present invention.

Figure 4:
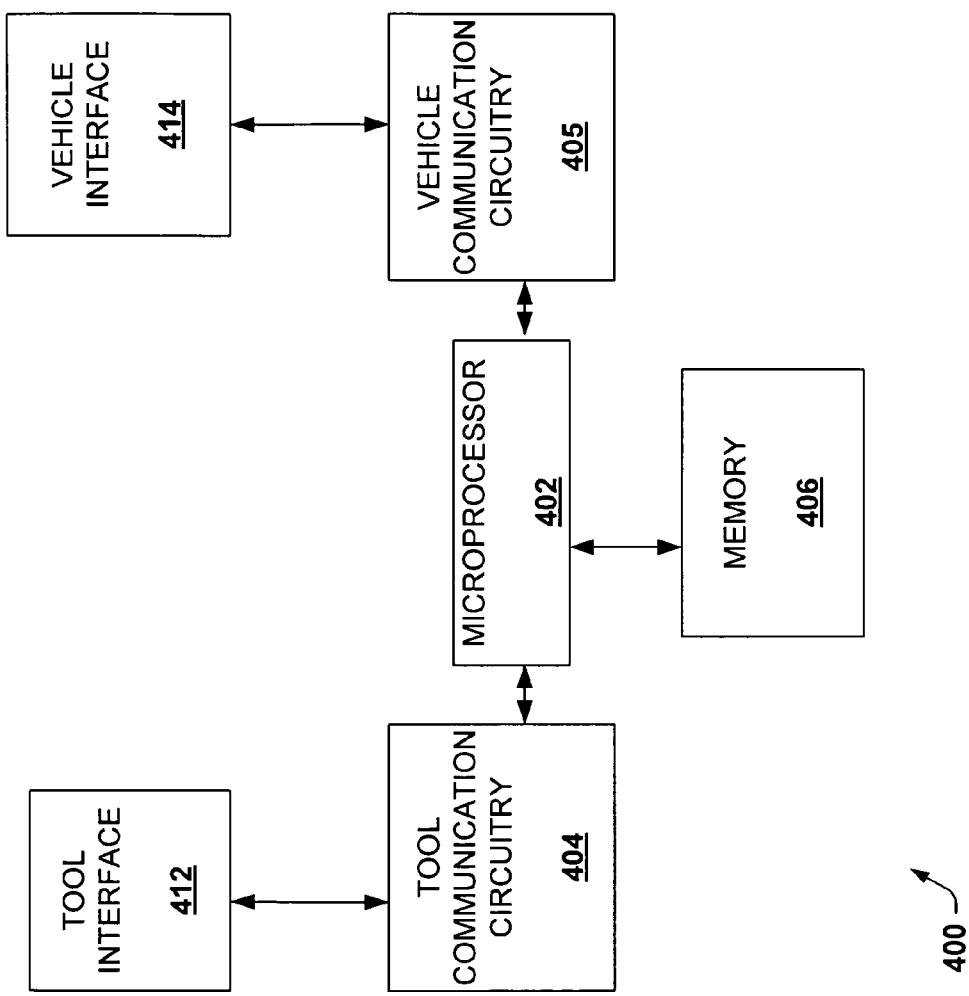
FIG. 4, a block diagram illustrating a universal translator in accordance with an aspect of the present invention is provided.

Turning now to FIG. 4, a block diagram illustrating a universal translator 400 in accordance with an aspect of the present invention is provided. The translator 400 is operable to receive requests and responses in accordance with one or more protocols and to translate and provide requests and responses in accordance with other one or more other protocols. The translator 400 includes a microprocessor 402, tool communication circuitry 404, vehicle communication circuitry 405, a memory unit 406, a vehicle information tool interface 412, and a vehicle information system interface 414.

The tool interface 412 is operable to receive requests in a tool protocol and to provide responses in the tool protocol. The tool protocol can be one of a number of protocols usable by diagnostic scan tools (e.g., OBD II compliant protocols). Similarly, the vehicle interface 414 is operable to receive responses in a vehicle protocol and to provide requests in the vehicle protocol. The vehicle protocol can also be one of a number of protocols usable by vehicle information systems (e.g., OBD II compliant protocols).

The tool communication circuitry 404 is operable to convert requests and responses from a first set of one or more translator protocols (e.g., OBD II compliant protocols, OBD compliant protocols, enhanced OBD II compliant protocols, and the like), which include the tool protocol, into a microprocessor readable format and to selectively convert microprocessor format responses into a protocol of the first set of translator protocols. The vehicle communication circuitry 405 is operable to convert requests and responses from a second set of one or more translator protocols (e.g., OBD II compliant protocols, OBD compliant protocols, enhanced OBD II compliant protocols, and the like), which include the vehicle protocol, into a microprocessor readable format and to selectively convert microprocessor format requests into a protocol of the second set of translator protocols.

The microprocessor 402 is coupled to the tool communication circuitry 404 and the vehicle communication circuitry 405 and controls both in order to translate received requests in the tool protocol to requests according to the vehicle protocol and then cause the requests in the vehicle protocol to be transferred to the vehicle interface 414. The microprocessor 402 employs the tool communication circuitry 404 to convert received requests from the tool interface 412 in the tool protocol to a microprocessor readable format. Subsequently, the microprocessor 402 employs the vehicle communication circuitry 405 to convert the request from the microprocessor readable format to requests according to the vehicle protocol, which are then provided to the vehicle interface 414. Additionally, the microprocessor 402 controls the vehicle communication circuitry 405 in order to translate received responses in the vehicle protocol from the vehicle interface 414 to a microprocessor readable format and then controls the tool communication circuitry 404 to translate from the microprocessor readable format into responses in the tool protocol, which are then provided to the tool interface 412. The microprocessor 402 also controls the communication circuitry to establish communication links with vehicle information systems and vehicle information tools.

The memory unit 406 is coupled to the microprocessor and can include volatile and/or non-volatile memory. The memory unit 406 can be employed by the microprocessor 402 to cache received requests and received responses to provide faster responses to requests via the tool interface 412. Additionally, the memory unit 406 includes program code executable by the microprocessor 402 in order to perform the above operations.

Other components, such as described with respect to FIG. 1, can also be present in the universal translator 400 of FIG. 4.

Figure 5:
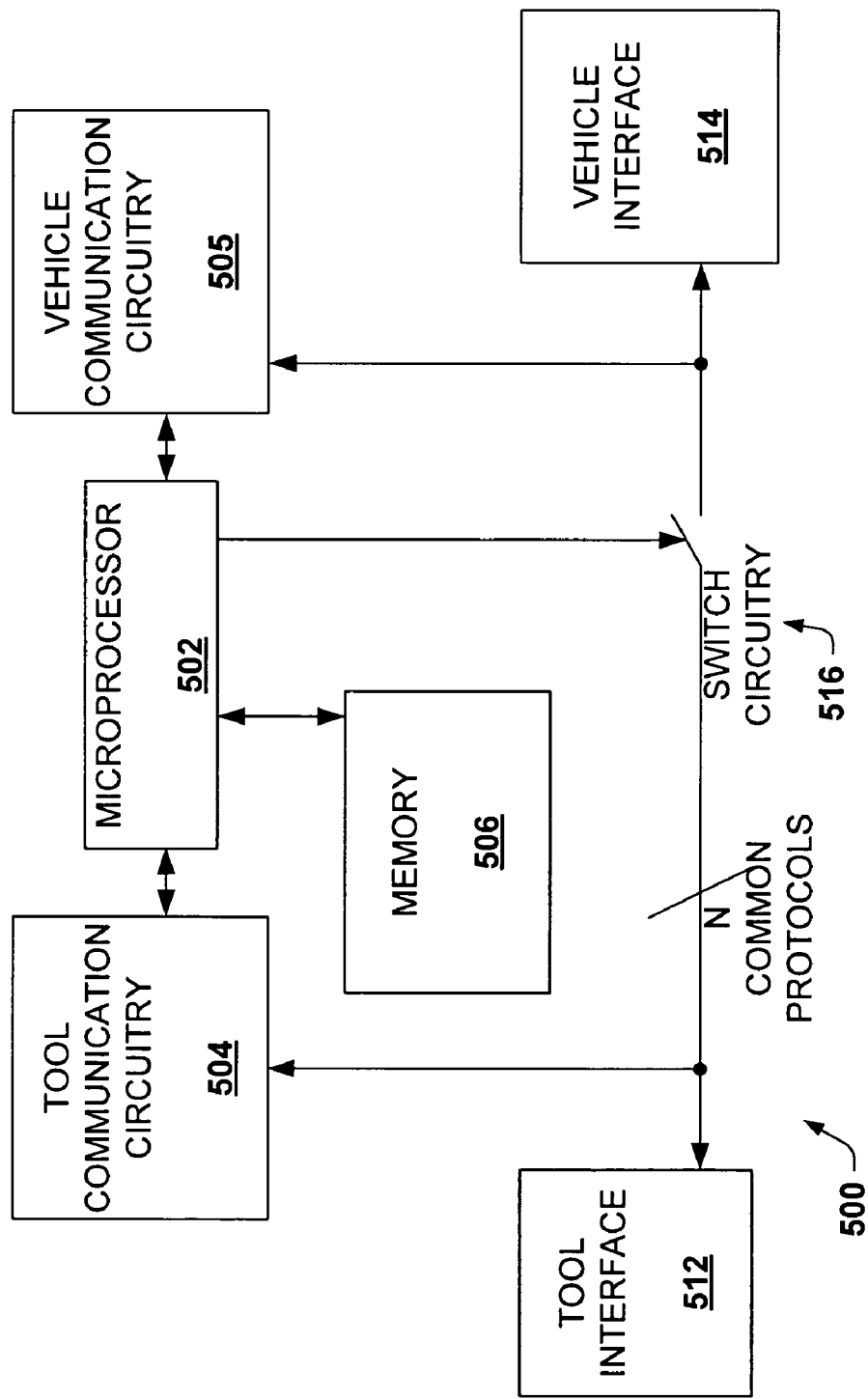
FIG. 5 is a block diagram illustrating another universal translator in accordance with an aspect of the present invention.

FIG. 5 is a block diagram illustrating another universal translator 500 in accordance with an aspect of the present invention. The translator 500 is operable to receive requests and responses in accordance with one or more protocols and to translate and provide requests and responses in accordance with other one or more other protocols. The translator 500 includes a microprocessor 502, tool communication circuitry 504, vehicle communication circuitry 505, a memory unit 506, a vehicle information tool interface 512, a vehicle information system interface 514, and switching circuitry 516.

As described with respect to FIGS. 3 and 4, the tool interface 512 is operable to receive requests in a tool protocol and to provide responses in the tool protocol. The tool protocol can be one of a number of protocols usable by vehicle information tools (e.g., a scan tool, a code reader, an engine analyzer, a hand held diagnostic tester, and the like). Similarly, the vehicle interface 514 is operable to receive responses in a vehicle protocol and to provide requests in the vehicle protocol. The vehicle protocol can also be one of a number of protocols usable by vehicle information systems.

The tool communication circuitry 504 is operable to convert requests and responses from a first set of one or more translator protocols (e.g., OBD II compliant protocols, OBD compliant protocols, enhanced OBD II compliant protocols, and the like), which include the tool protocol, into a microprocessor readable format and to selectively convert microprocessor format responses into a protocol of the first set of translator protocols. The vehicle communication circuitry 505 is operable to convert requests and responses from a second set of one or more translator protocols (e.g., OBD II compliant protocols, OBD compliant protocols, enhanced OBD II compliant protocols, and the like), which include the vehicle protocol, into a microprocessor readable format and to selectively convert microprocessor format requests into a protocol of the second set of translator protocols.

The microprocessor 502 is coupled to the tool communication circuitry 504, the vehicle communication circuitry 505, and the switch circuitry 516 and controls all three in order to translate or pass received requests in the tool protocol to requests according to the vehicle protocol and then cause the requests in the vehicle protocol to be transferred or passed to the vehicle interface 514. On receiving a request in the tool protocol from the tool interface 512, the microprocessor 502 determines whether the tool protocols is compatible with or the same as the vehicle protocol being employed via the vehicle interface 514. If so, the microprocessor 502 instructs the switch circuitry 516 to directly connect the tool interface 512 to the vehicle interface 514. Otherwise, the microprocessor 502 instructs the switch circuitry 516 to disconnect the tool interface 512 from the vehicle interface 514. Then, the microprocessor 502 employs the tool communication circuitry 504 to convert received requests from the tool interface 512 in the tool protocol to a microprocessor readable format. Subsequently, the microprocessor 502 employs the vehicle communication circuitry 505 to convert the request from the microprocessor readable format to requests according to the vehicle protocol, which are then provided to the vehicle interface 514. On receiving a response in the vehicle protocol from the vehicle interface 514 and/or on receiving a request in the tool protocol, the microprocessor 502 analyzes whether the vehicle protocol is compatible with or the same as the tool protocol being employed via the tool interface 512. If so, the microprocessor 502 instructs the switch circuitry 516 to directly connect the tool interface 512 to the vehicle interface 514. Otherwise, the microprocessor 502 instructs the switch circuitry 516 to disconnect the tool interface 512 from the vehicle interface 514. Then, the microprocessor 502 controls the vehicle communication circuitry 505 in order to translate received responses in the vehicle protocol from the vehicle interface 514 to a microprocessor readable format and then controls the tool communication circuitry 504 to translate from the microprocessor readable format into responses in the tool protocol, which are then provided to the tool interface 512. The microprocessor 502 also controls the communication circuitry to establish communication links with vehicle information systems and vehicle information tools.

The memory unit 506 is coupled to the microprocessor and can include volatile and/or non-volatile memory. The memory unit 506 can be employed by the microprocessor 502 to cache received requests and received responses to provide faster responses to requests via the tool interface 512. Additionally, the memory unit 506 includes program code executable by the microprocessor 502 in order to perform the above operations.

Other components, such as described with respect to FIG. 2, can also be present in the universal translator 500 of FIG. 5.

In view of the foregoing structural and functional features described supra, methodologies in accordance with various aspects of the present invention will be better appreciated with reference to the above figures and descriptions. While, for purposes of simplicity of explanation, the methodologies of FIG. 6A, FIG. 6B, FIG. 7, and FIG. 8 are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Figure 6A:
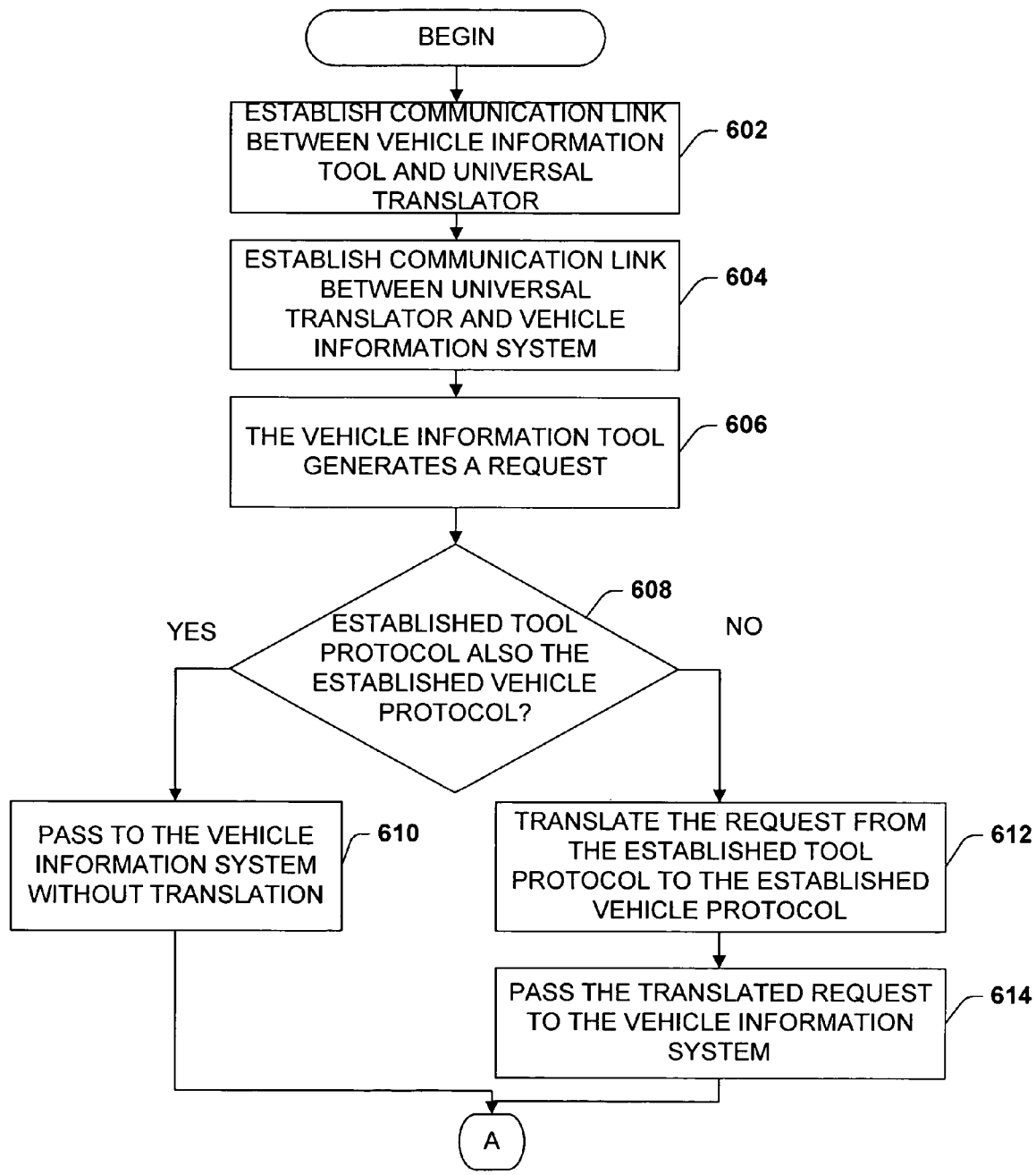
FIGS. 6A and 6B are a flow diagram illustrating a method of processing vehicle information in accordance with an aspect of the present invention.
Figure 6B:
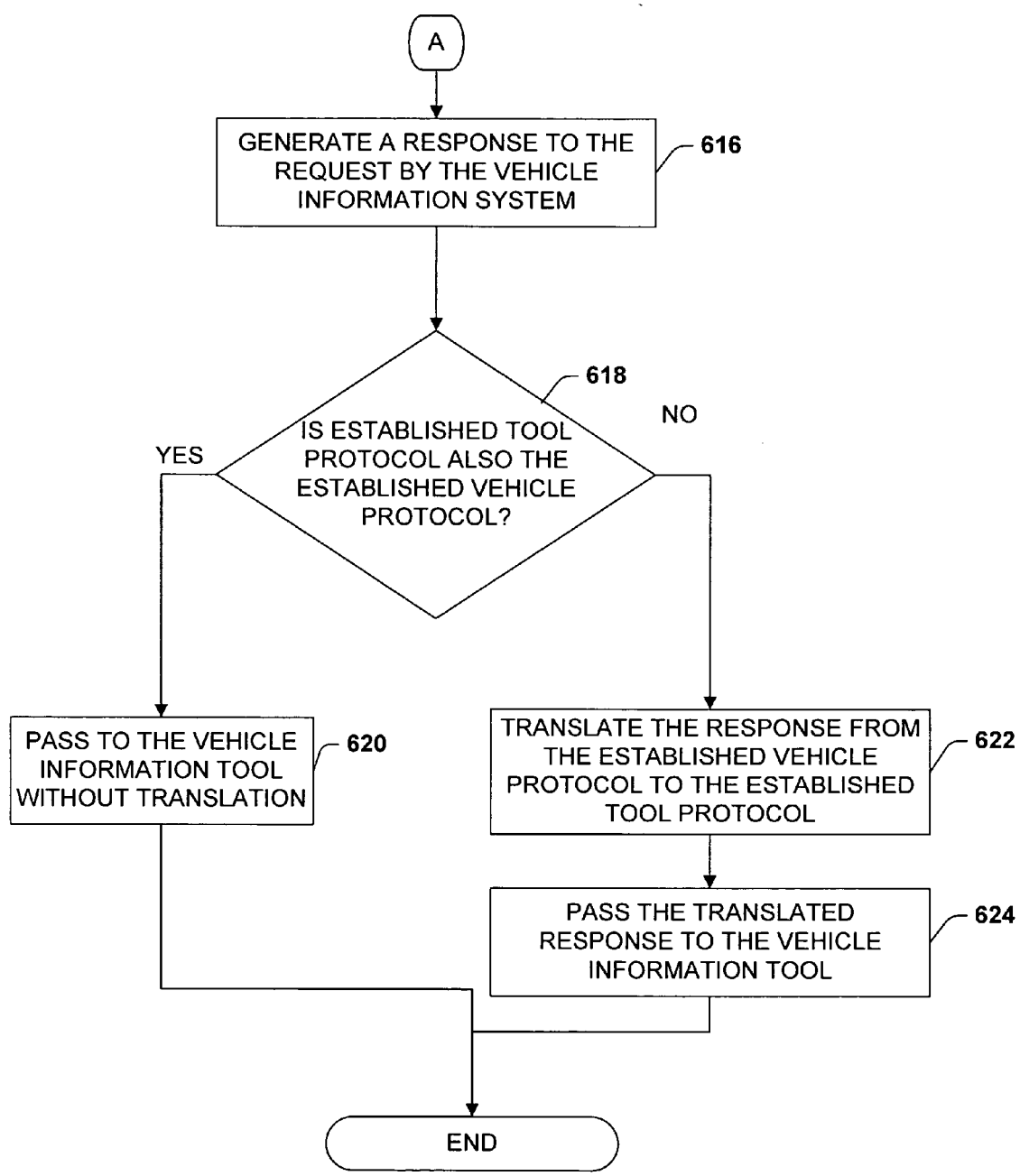

FIGS. 6A and 6B are a flow diagram illustrating a method 600 of processing vehicle information in accordance with an aspect of the present invention. The method 600 translates vehicle information allowing and facilitating communication between vehicle information tools (e.g., a scan tool, a code reader, an engine analyzer, a hand held diagnostic tester, and the like) and vehicle information systems even without a shared or common protocol for communicating. The method 600 can be employed repeatedly to process additional requests and/or responses.

The method begins at block 602, wherein a vehicle information tool (e.g., a scan tool, a code reader, an engine analyzer, a hand held diagnostic tester, and the like) establishes a communication link with a universal translator via a tool protocol. The vehicle information tool is operable to employ one or more protocols referred as tool protocol(s). The vehicle information tool can have other usable protocols in addition to the tool protocol employed to establish the communication link. The universal translator includes a set of usable protocols referred to as translator protocols, one of which is compatible with the tool protocol or is the tool protocol employed to establish the communication link. A suitable mechanism to establish the communication link has been described supra.

The universal translator establishes a communication link with a vehicle information system at block 604 via a vehicle link protocol. This communication link can be established as a result of powering on or initializing the universal translator and/or in response to establishment of the communication link between the universal translator and the vehicle information tool. It is appreciated that the communication link between the universal translator and the vehicle information system can be established prior to the communication link between the vehicle information tool and the universal translator. The vehicle information system can be operable to utilize other protocols in addition to the vehicle link protocol and one of the translator protocols is compatible with the vehicle link protocol or is the vehicle link protocol.

The vehicle information tool then sends a request to the universal translator via the established tool protocol at block 606. If the established tool protocol is also the established vehicle protocol at block 608, the method continues at block 610 wherein the request is passed to the vehicle information system. Otherwise, the request is translated from the established tool protocol into a request according to the established vehicle protocol at block 612. Continuing, the translated request is then provided to the vehicle information system at block 614.

A response to the request is generated by the vehicle information system according to the established vehicle profile at block 616. If the established vehicle protocol is also the established tool protocol at block 618, the method continues at block 620 wherein the universal translator provides the response to the vehicle information tool. If not, the response is translated from the established vehicle protocol into a response according to the established tool protocol at block 622. Subsequently, the response is provided to the vehicle information tool at block 624.

Figure 7:
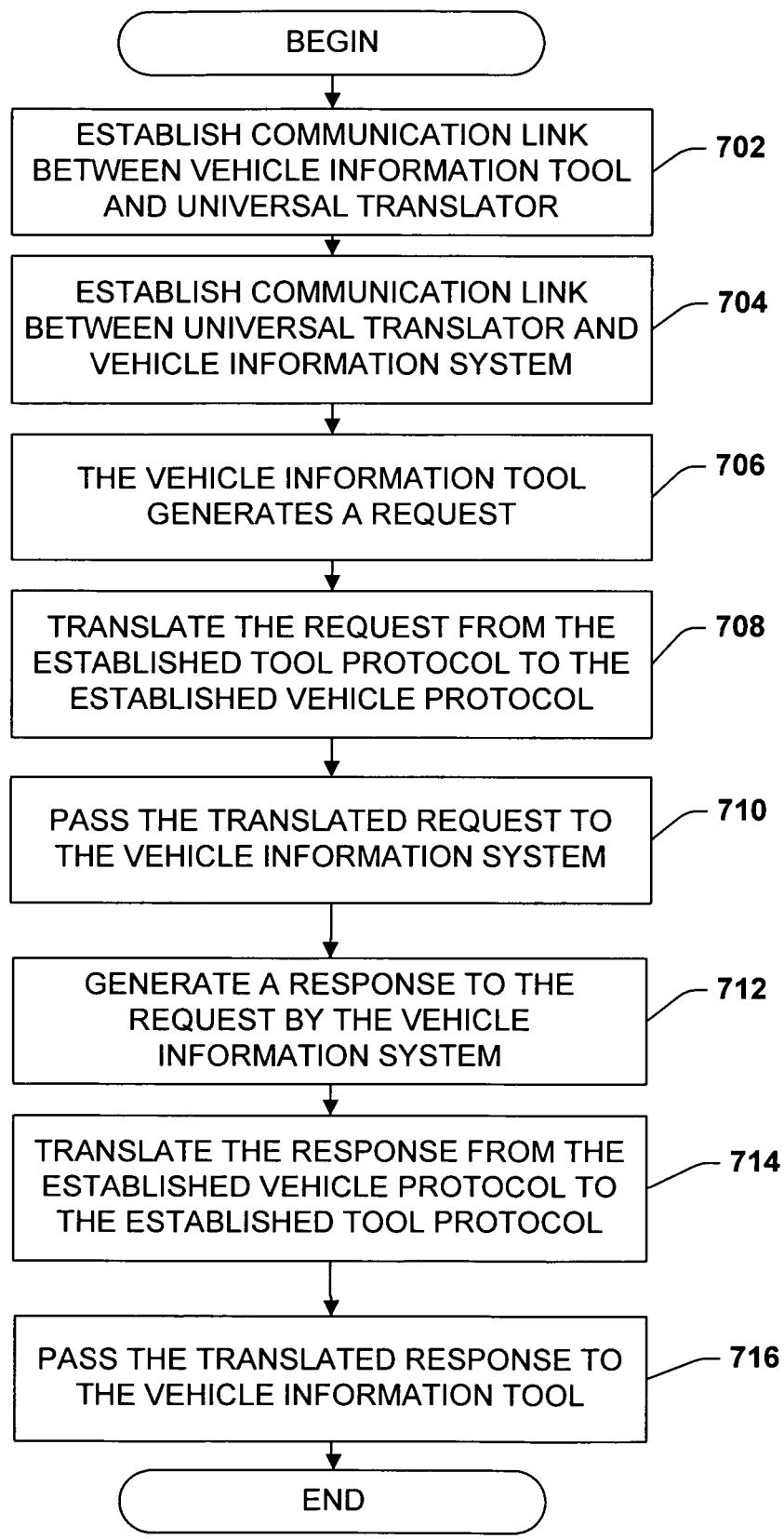
FIG. 7 is a flow diagram illustrating a method of processing vehicle information in accordance with an aspect of the present invention.

FIG. 7 is a flow diagram illustrating a method 700 of processing vehicle information in accordance with an aspect of the present invention. The method 700 translates vehicle information allowing and facilitating communication between vehicle information tools and vehicle information systems even without a shared or common protocol for communicating.

The method begins at block 702, wherein a communication link with a universal translator and a vehicle information tool (e.g., a scan tool, a code reader, an engine analyzer, a hand held diagnostic tester, and the like) is established via a tool protocol. The vehicle information tool is operable to employ one or more protocols referred as tool protocol(s). The vehicle information tool can have other usable protocols in addition to the tool protocol employed to establish the communication link. The universal translator includes a set of usable protocols referred to as translator protocols, wherein at least one of the set is compatible with the tool protocol or is the tool protocol employed to establish the communication link. The tool protocol is selected from one or more common protocols by a dynamic selection mechanism and/or a manual selection mechanism (e.g., selected by a user or operator). A suitable dynamic mechanism to establish the communication link has been described supra.

The universal translator establishes a communication link with a vehicle information system at block 704 via a vehicle link protocol. The vehicle information system is operable to employ one or more protocols referred to as vehicle diagnostic protocols. The vehicle link protocol employed in establishing the communication link is a member of both the vehicle diagnostic protocols and the translator protocols and can be dynamically selected or manually selected by a user or operator. The communication link can be established as a result of powering on or initializing the universal translator and/or in response to establishment of the communication link between the universal translator and the vehicle information tool. It is appreciated that the communication link between the universal translator and the vehicle information system can be established prior to the communication link between the vehicle information tool and the universal translator. The vehicle information system can be operable to utilize other protocols in addition to the vehicle link protocol and one of the translator protocols is compatible with the vehicle link protocol or is the vehicle link protocol.

The vehicle information tool then generates and/or sends a request to the universal translator via the established tool protocol at block 706. The request is translated from the established tool protocol into a request according to the established vehicle protocol at block 708. Continuing, the request is then provided to the vehicle information system at block 710.

A response to the request is generated by the vehicle information system according to the established vehicle profile at block 712 according to the established vehicle protocol. The response is translated from the established vehicle protocol into a response according to the established tool protocol at block 714. Subsequently, the response is provided to the vehicle information tool at block 716.

Figure 8:
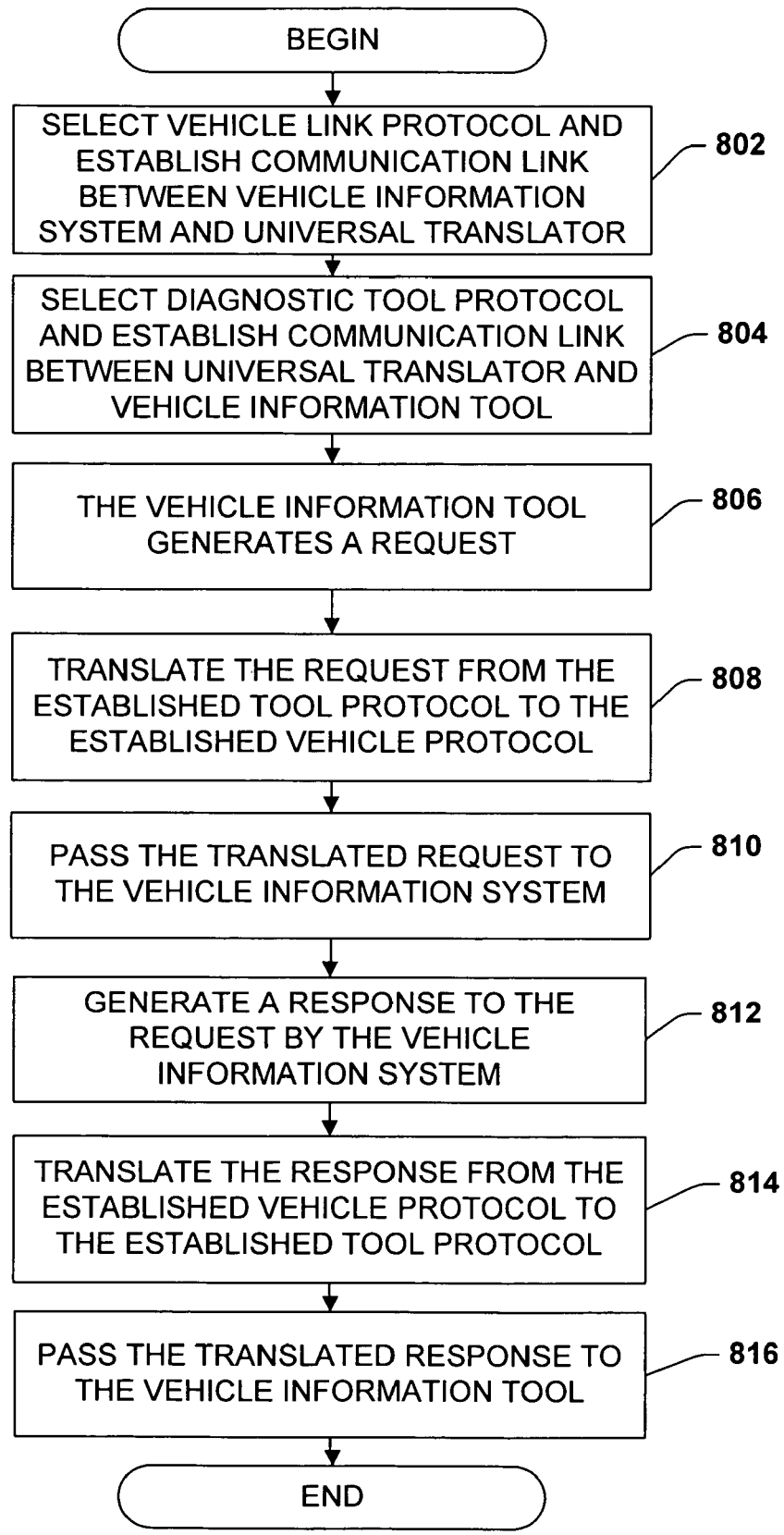
FIG. 8 is a flow diagram illustrating a method of processing vehicle information in accordance with an aspect of the present invention.

FIG. 8 is a flow diagram illustrating a method 800 of processing vehicle information in accordance with an aspect of the present invention. The method 800 dynamically selects protocols and translates vehicle information facilitating communication between vehicle information tools and vehicle information systems even without a shared or common protocol for communicating between the vehicle information tools and the vehicle information systems.

A universal translator dynamically selects a vehicle link protocol and establishes a communication link with a vehicle information system at block 802. This communication link can be established as a result of powering on or initializing the universal translator and/or in response to establishment of the communication link between the universal translator and the vehicle information tool. The universal translator includes a set of usable protocols referred to as translator protocols. The vehicle information system also includes a set of usable protocols referred to as vehicle protocols. The vehicle link protocol is a member of both the translator protocols and the vehicle protocols. The vehicle information system can be operable to utilize other protocols in addition to the vehicle link protocol and one of the translator protocols is compatible with the vehicle link protocol or is the vehicle link protocol. Criteria employed in selecting the vehicle link protocol include commands available, data transfer speed, types of commands to be employed, desired control unit to communicate with, and the like.

A universal translator dynamically selects a tool protocol and establishes a communication link with the vehicle information tool according to the selected protocol. The vehicle information tool is operable to employ one or more protocols referred as tool protocol(s). The vehicle information tool can have other usable protocols in addition to the tool protocol employed to establish the communication link. The universal translator includes a set of usable protocols referred to as translator protocols, one of which is compatible with the tool protocol or is the tool protocol employed to establish the communication link. A suitable mechanism to establish the communication link has been described supra. It is appreciated that the communication link between the universal translator and the vehicle information system can be established prior to the communication link between the vehicle information tool and the universal translator. Criteria employed in selecting the tool protocol include commands available, data transfer speed, types of commands to be employed, desired control unit to communicate with, and the like.

The vehicle information tool then generates and/or sends a request to the universal translator via the established tool protocol at block 806. The request is translated from the established tool protocol into a request according to the established vehicle protocol at block 808. Continuing, the request is then provided to the vehicle information system at block 810.

A response to the request is generated by the vehicle information system according to the established vehicle profile at block 812 according to the established vehicle protocol. The response is translated from the established vehicle protocol into a response according to the established tool protocol at block 814. Subsequently, the response is provided to the vehicle information tool at block 816.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A universal translator for vehicle information systems comprising:
   a tool interface that receives requests and provides responses;
   a communication circuitry that selectively converts requests and responses from one or more translator protocols into a microprocessor readable format and that selectively converts microprocessor format requests and responses into the one or more translator protocols;
   a vehicle interface that provides requests and receives responses;
   a microprocessor that controls the communication circuitry to translate received tool interface requests from a tool protocol to a vehicle protocol, that provides the translated requests to the vehicle interface, that translates received vehicle interface responses from the vehicle protocol to the tool protocol, and that provides the translated responses to the tool interface;
   a non-volatile memory coupled to the microprocessor, wherein the non-volatile memory stores operating code for the microprocessor; and
   a data port coupled to the non-volatile memory, wherein the data port is operable to receive external data that alters the operating code stored within the non-volatile memory, wherein the data port is further coupled to a memory unit, wherein the microprocessor stores diagnostic requests and diagnostic responses in the memory unit and the stored diagnostic requests and the stored diagnostic responses are retrievable via the data port from the memory unit.

2. The universal translator of claim 1, further comprising a memory unit, wherein the microprocessor stores requests and responses in the memory unit.

3. The universal translator of claim 1, wherein the vehicle interface is operable to receive external data that alters the operating code stored within the non-volatile memory.

4. The universal translator of claim 1, further comprising a switching circuit coupled to the tool interface and the vehicle interface and controlled by the microprocessor, wherein the switching circuit selectively connects the tool interface and the vehicle interface, wherein the microprocessor causes the switching circuit to connect the tool interface and the vehicle interface on the vehicle protocol also being the tool protocol.

5. A method of operating a vehicle system comprising:
   establishing a first communication link between a vehicle information tool and a universal translator via a tool protocol;
   establishing a second communication link between the universal translator and a vehicle information system via a vehicle protocol;
   initiating one or more requests by the vehicle information tool according to the tool protocol;
   translating the requests from the tool protocol to the vehicle protocol;
   generating one or more responses by the vehicle information system upon receiving the translated requests in the vehicle protocol; and translating the responses from the vehicle protocol to the tool protocol; and
   caching translated responses in the tool protocol and providing the cached responses on matching requests.

6. The method of claim 5, further comprising passing the requests by the vehicle information tool to the vehicle information system without translation on the tool protocol also being the vehicle protocol.

7. The method of claim 5, further comprising dynamically selecting the tool protocol prior to establishing the first communication link.

8. The method of claim 5, further comprising dynamically selecting the vehicle protocol prior to establishing the second communication link.

9. The method of claim 5, wherein translating the requests further comprises converting header information of the requests from a format of the tool protocol to a format of the vehicle protocol.

10. The method of claim 5, wherein translating the responses comprises combining multiple responses into a single response.

11. The method of claim 5, wherein translating the responses comprises segmenting a single response into multiple responses.

12. The method of claim 5, further comprising manually selecting the tool protocol by an operator.

13. The method of claim 5, further comprising manually selecting the vehicle protocol by an operator.

* * * * *